Jan. 12, 1943.  J. S. HIGHFIELD  2,307,888
METERING APPARATUS
Filed Dec. 6, 1940  3 Sheets-Sheet 1

INVENTOR
John Somerville Highfield
BY
Ralph B. Stewart
ATTORNEY

Jan. 12, 1943.    J. S. HIGHFIELD    2,307,888
METERING APPARATUS
Filed Dec. 6, 1940    3 Sheets-Sheet 3
Fig. 3.
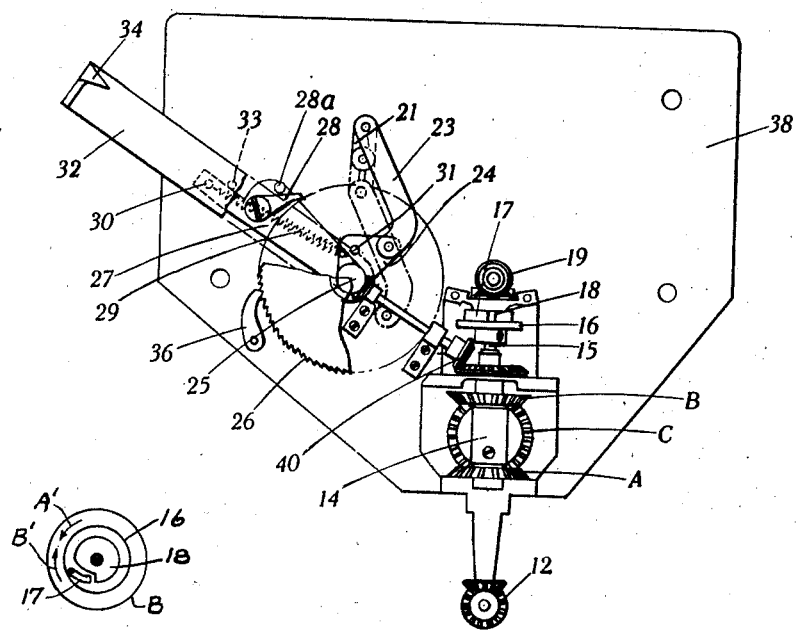
Fig. 3a
Fig. 4.
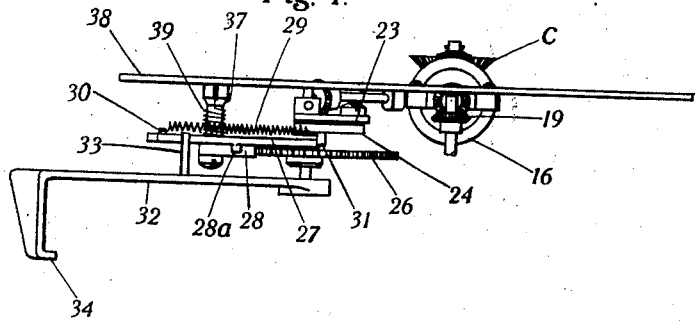
INVENTOR
John Somerville Highfield
BY
Ralph B. Stewart
ATTORNEY Patented Jan. 12, 1943

2,307,888

UNITED STATES PATENT OFFICE 2,307,888

METERING APPARATUS

John Somerville Highfield, London, England

Application December 6, 1940, Serial No. 368,926
In Great Britain December 12, 1939

8 Claims. (Cl. 171—34)

This invention relates primarily to electricity meters but may also be applied to meters for measuring the consumption of gas or water.

At present, electricity is sold in various ways, the two simplest alternatives being either to charge a fixed price per unit or kilowatt hour, or a varying price depending upon the quantity consumed in a given period. Another method of charging consumers is that known as the two-part tariff. In this a fixed rate is charged which may be assessed in various ways, and in addition a charge is made for each unit recorded by meter. The fixed rate in question may be based on the maximum demand, either as measured or as connected load, or it may be based on the area of the floor space of the consumer's premises or on the rateable value of the property or on the number of rooms or in other ways. Except for the case where the maximum demand is actually measured, the other methods of assessing the fixed rate are all approximate and bear only a qualified relationship to the amount of electricity actually consumed. On the other hand, the procedure of measuring the maximum demand results in the consumer having to meet an unduly heavy charge in cases where part of the demand is only of a temporary nature, for example where certain appliances are only used for a comparatively small number of hours in a year.

It is apparent, therefore, that the various methods of assessing the charge to be made under the two-part tariff are all open to objections, and the object of the present invention is to overcome the difficulties of the rigid maximum demand method and of the various approximate methods of assessment under the two-part tariff. Although this tariff is not ordinarily adopted in connection with gas and water supplies, there is no apparent reason why it should not be applied to these services as well as to electricity.

The present invention involves the use of a metering apparatus which includes two sets of meter dials, the arrangement being such that only one set of dials registers the consumption of electricity, gas or water, as the case may be, so long as a predetermined rate of use is not exceeded, but when that rate is exceeded the other set of dials registers the excess consumption. The two sets of dials constitute two separate meters, although they may be accommodated in a single casing if desired. The consumer is assessed to the amount of what may be called the normal maximum demand which will be used regularly, at least during the winter months, and the metering apparatus is set to correspond to this demand. The fixed rate is paid on this assessment, and in the case of electricity the units measured by meter are charged at a relatively low rate. The apparatus is so arranged that when the aforesaid normal maximum demand is exceeded, the second set of meter dials registers all the units consumed due to the excess load. In other words, the first meter registers all the units used and the second meter shows only the units consumed owing to that part of the load which exceeds the predetermined normal maximum, these units being strictly in proportion to the load in excess of that normal maximum. The consumer pays a higher rate for the units registered by the second meter, and is charged at a lower rate for the difference between the readings of the two meters.

The usual forms of driving mechanism may be employed, namely, an induction motor in the case of electricity, and a mechanical device actuated by fluid flow in the case of gas or water.

A particular object of the present invention is to provide readily settable or adjustable means for varying or setting the normal maximum load at which the "excess" register begins to operate.

More specifically, metering apparatus in accordance with the invention includes mechanism for driving a set of meter dials in the ordinary way; a differential gear, one sun-wheel of which is driven by the same mechanism, and the other sun-wheel of which is driven intermittently by means of an intermittent driving mechanism which is actuated by any source of power, but, most conveniently by a constant speed drive, for example a synchronous motor or electrically-wound clockwork (or ordinary clockwork in the case of gas or water meters); and a second set of meter dials arranged to be operated through a one-way clutch which is controlled by the planet carrier of the differential gear and is arranged to have lost-motion so that when the direction of rotation of the planet carrier shaft reverses, each time that the intermittent drive ceases, the driving member of the clutch does not immediately engage the driven member of the clutch but first has to make up the lost ground represented by the previous retrograde displacement of the driving member produced when the intermittent driving mechanism operated.

Preferably, the intermittent driving mechanism comprises a ratchet wheel which is actuated by a pawl carried by a radial arm pivoted on an axis concentric with the ratchet wheel, the radial arm being connected by a tension spring to a bell-crank member which is oscillated by a crank driven from the aforesaid constant speed drive. Provision is made for restoring the radial arm to its initial position when the oscillating bell-crank member carries out its return movement. Moreover, by controlling the angle through which the ratchet wheel is turned for each revolution of the crank, the mechanism can also be made to serve as a change-speed device for varying the point at which the "excess" register begins to operate. For this purpose, it is convenient to provide an adjustable stop in the path of the radial arm so as to limit the extent of the drive to the amount desired and thereby set the normal maximum demand.

In order that the invention may be clearly understood and readily carried into effect, a two-part tariff electricity meter in accordance therewith will now be described, by way of example, with reference to the accompanying drawings, in which:

Figure 3 is an elevation showing part of the mechanism in detail;

Figure 3a is a plan view showing the elements forming the one-way clutch providing lost motion drive between the planet carrier and the "excess" register; and Figure 4 is a plan of the mechanism shown in Figure 3.

The meter is contained in a casing 1, a removable part of which has been omitted from the drawings so as to reveal the mechanism. The removable part of the casing is normally held in place by a pair of screw-threaded rods 2.

Figure 1:
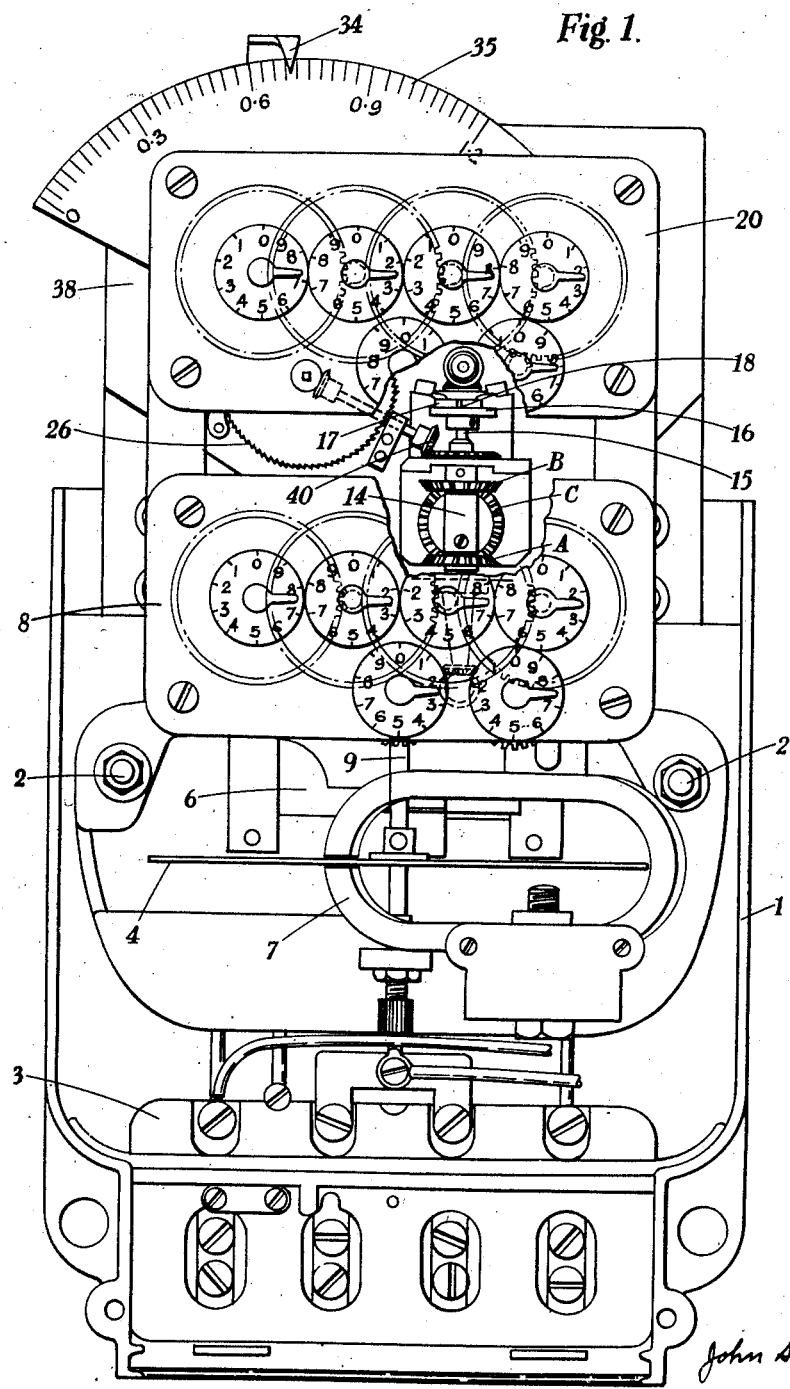
Figure 1 is a front elevation of the meter, with part of the casing removed.
Figure 2:
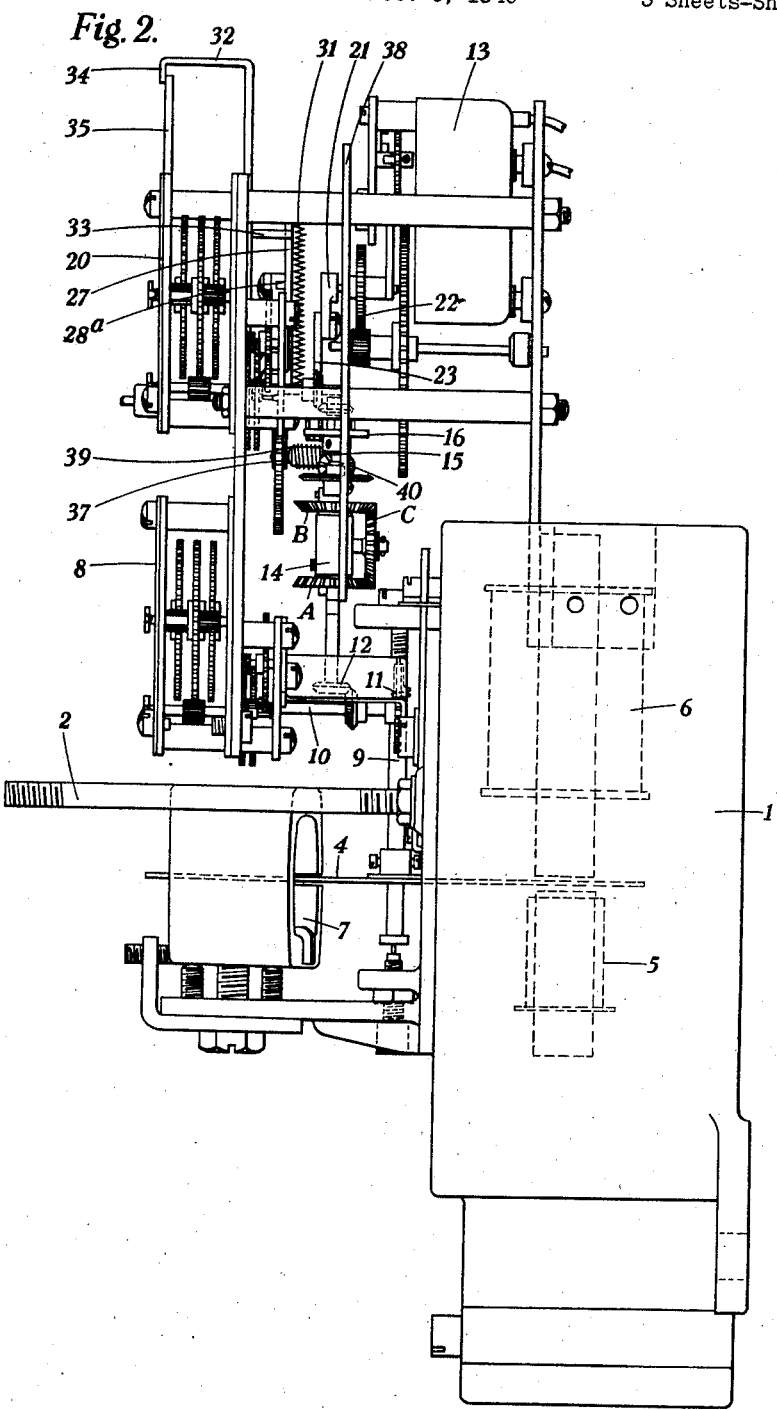
Figure 2 is a side elevation as seen from the right of Figure 1.

In the base of the casing there is a terminal block 3 from which leads run to the windings of an induction wattmeter of the usual type having an induction disc 4, a two-pole series magnet 5, a three-pole shunt magnet 6, and a permanent brake magnet 7. This wattmeter drives one set of meter dials 8 in the ordinary way, the rotor spindle 9 driving the spindle 10 (Figure 2) of the train associated with the set of meter dials 8 through worm gearing 11.

The drive communicated by the rotor spindle 9 to the spindle 10 is also communicated, by way of bevel gearing 12, to one sun-wheel A of a differential or planetary gear, the other sun-wheel B of which is arranged to be driven intermittently by means of an intermittent driving mechanism which is itself driven by a synchronous electric motor 13. The planet wheel C of the differential gear is mounted on a planet carrier 14, the shaft 15 of which is fitted with a disc 16 carrying a pawl 17 which co-operates with a wheel having only one ratchet tooth 18. The combination of the disc 16, pawl 17 and ratchet 18 constitutes a one-way clutch which is arranged to drive, through bevel gearing 19, a second set of meter dials 20. This set of meter dials registers only the excess consumption above the normal maximum demand for which the apparatus is set, whereas the first set of meter dials 8 registers the total consumption of electricity.

The synchronous motor 13, which in the particular example under consideration, is designed to run at a constant speed of 200 revolutions per minute, is caused to rotate a crank 21 at 8 revolutions per minute through reduction gearing 22. This crank actuates an arm or link 23 which is pivotally connected to a bell-crank member 24 (Figure 3) loosely mounted on the shaft 25 of a ratchet wheel 26, having about 160 teeth. The arrangement is such that the movement of the crank 21 from the top position shown in full lines in Figure 3 to the bottom position shown in chain lines causes the member 24 to turn through a right-angle, and the return movement of the crank 21 to the top position results in reverse turning of the member 24 back to its initial position; that is to say, for each revolution made by the crank 21, the bell-crank member 24 oscillates through an arc of 90°.

A radial arm 27, loosely mounted on the shaft 25, carries a pawl 28 which co-operates with the teeth of the ratchet wheel 26. One end of a light, coiled tension spring 29 is attached to the radial arm 27 at 30 near the place where the pawl 28 is mounted, and the other end of this spring is secured to the bell-crank member 24. The latter carries an abutment pin 31 against which the radial arm 27 bears (due to the action of the spring 29) when the crank 21 is at its top dead-centre. When the crank 21 rotates from this position, the resulting turning of the bell-crank member 24 causes the abutment pin 31 to follow an arcuate path, and the increasing tension of the spring 29, due to the turning of the bell-crank member 24, causes the radial arm 27 to swing so that its pawl 28 drives the ratchet wheel 26. When the bell-crank member 24 carries out its return movement, through the arc of 90°, its abutment pin 31 bears against the radial arm 27 and restores it to the initial position, the pawl 28 slipping over the ratchet teeth while this is being effected. A lug 28a on the radial arm 27 serves to keep the pawl 28 from becoming displaced without, however, impeding the free action of the pawl.

The extent to which the ratchet wheel 26 is driven for each revolution of the crank 21 is governed by the setting of an adjustable pointer arm 32 which is mounted radially with respect to the ratchet wheel 26 and is friction-tight, so that it stays in any position to which it is adjusted by hand. This pointer arm carries an abutment 33 which lies in the path of movement of the radial arm 27, and the arrangement is such that, at each forward movement of the radial arm, the pawl 28 drives the ratchet wheel 26 until the radial arm 27 is arrested by meeting the abutment 33 on the pointer arm 32. If this happens before the bell-crank member 24 has completed its forward turning movement, the completion of this movement merely results in the spring 29 being stretched, the radial arm 27 remaining stationary until returned to its initial position in the way already described.

The pointer arm 32 is bent twice at right angles and its pointed end 34 co-operates with a graduated scale 35, the value to which the pointer arm is set by hand representing the agreed normal maximum demand. In practice, of course, the meter casing is sealed so that no unauthorised person can alter the setting. It may be mentioned that if the pointer arm 32 is set to one extreme position on the scale 35 (viz. so that the pointer 34 is opposite the zero graduation), the associated abutment 35 prevents the radial arm 27 from moving at all, the rotation of the crank 21 in this case merely resulting in stretching the spring 29, since the latter is not powerful enough to overcome the resistance to movement of the pointer arm 32. However, this state of affairs would only arise if it were desired for any reason to suspend operation of the two-part tariff scheme, because with the pointer arm 32 set to the position in question, the total consumption would be registered on the second set of meter dials as well as on the first set.

Depending upon the setting of the pointer arm 32, the ratchet wheel 26 can be driven through an angle which may vary from that corresponding to the arc occupied by only one or two teeth up to that corresponding to the arc occupied by about 50 teeth of the ratchet wheel 26. When the pointer arm 32 is set to a normal maximum demand of, say, 1 kilowatt, the ratchet wheel 26 is driven intermittently so that it makes 2 revolutions per minute. A pawl 36, which is pivoted on a shaft 37 fixed to a base plate 38, is provided for the purpose of preventing reverse motion of the ratchet wheel 26 such as might otherwise result from the return movement of the radial arm 27 when its pawl 28 is slipping over the ratchet teeth. The pawl 36 is acted upon by a coiled spring 39 which is wound around the shaft 37.

The drive from the ratchet wheel 26 is transmitted by bevel gearing 40 to the sun-wheel B of the differential gear, the other sun-wheel A of which is driven directly from the ordinary meter mechanism, which includes the rotor 4, as already explained. Also, as mentioned earlier, the shaft 15 on which the planet carrier 14 is mounted, controls the one-way clutch 16, 17, 18 to which the second set of meter dials 20, which records the consumption in excess of the normal maximum demand, is coupled. Figure 3a is a plan view of the one-way clutch formed by the disc 16 carrying the pawl 17 which cooperates with the one-tooth ratchet 18 which drives bevel gearing 19. The arrangement is such that with sun-wheel A stationary, the intermittent drive of sun-wheel B from ratchet wheel 26 tends to rotate disc 16 in the direction indicated by the arrow B' in Figure 3a, and when sun-wheel B is stationary, sun-wheel A tends to rotate disc 16 in the direction of the arrow A', thus bringing the pawl 17 into driving engagement with ratchet 18. If no power is being consumed, sun-wheel A remains stationary, and the "excess" register 20 will not be operated by the intermittent rotation of sun-wheel B. If power is being consumed, rotation of sun-wheel A will cause a steady rotation of disc 16 in the direction of the arrow A' tending to cause engagement of the pawl 17 with the ratchet 18, except at the intervals when the sun-wheel B is being rotated by the ratchet wheel 26. It will be clear that if the planet carrier shaft 15 turns so as to bring the pawl 17 into driving engagement with the ratchet tooth 18, and thereby causes the drive to be transmitted to the set of meter dials 20, and then the direction of rotation of the planet carrier shaft 15 is reversed so that there is no drive through the clutch, there is lost-motion before the pawl 17 can next engage the tooth 18 to drive the clutch.

So long as the consumption does not exceed the normal maximum demand to which the pointer arm 32 has been set, the number of revolutions made in a given period of time by the intermittently driven sun-wheel B of the differential gear is greater than the number of revolutions made in the same time by the other sun-wheel A, and, in normal circumstances, no drive is transmitted through the one-way clutch to the set of meter dials 20. The reason why this is so results from the fact that the one-way clutch has lost-motion, as already described. In other words, when the direction of rotation of the planet carrier shaft 15 reverses each time that the intermittent drive ceases, the pawl 17 does not immediately engage the tooth 18 of the clutch, so as to drive it, but first has to make up the lost ground represented by the previous retrograde displacement of the pawl 17 produced when the intermittent drive operated. Normally, however, in the case under consideration where the consumption is below the normal maximum demand, before the pawl 17 could make up the lost ground and engage the tooth 18, the intermittent drive would operate again and move the pawl further away from the tooth. It is true that, by chance, the pawl 17 might happen to be very close to, or even touching, the tooth 18 when the meter is brought into service. Then, if in addition the intermittent drive did not happen to operate immediately, the drive would be wrongly transmitted to the set of meter dials 20 during the short time elapsing before the intermittent drive took place. However, the error that could arise from this rather unlikely combination of circumstances would probably be smaller than the accuracy with which the meter could be read, and certainly it would be of no practical importance.

When the consumption is equal to the normal maximum demand, the intermittently driven sun-wheel B goes faster, when driven, than the sun-wheel A in order to make up for the periods when the sun-wheel B is at rest, and consequently the total number of revolutions made in a given period of time is the same for both wheels, so that there is no drive through the one-way clutch to the set of meter dials 20.

When the normal maximum demand is exceeded, the continuously driven sun-wheel A makes a greater number of revolutions in a given period of time than the intermittently driven sun-wheel B, and so the clutch engages and drives the set of meter dials 20 registering the excess consumption.

Finally, it is to be observed that although the particular meter illustrated in the drawings has only a single ratchet tooth 18 in the one-way clutch, it is not necessarily essential in every case to have only this one tooth. The advantage of having only the one tooth 18 is that it provides the maximum amount of tolerance, namely practically a whole revolution of lost-motion, during which the sun-wheel A might tend to drive the pawl 17 backwards, while the sun-wheel B was trying to drive this pawl forward. It does not really matter how many ratchet teeth are provided in the one-way clutch, so long as the number of such teeth is not too large to enable the requisite amount of lost-motion to be obtained. This depends upon the rate of revolution of the crank 21 and the number of "kicks" imparted to the sun-wheel B while the sun-wheel A makes one revolution. The kicks in question may be frequent and of short duration, or they may be infrequent and of long duration, either possibility resulting in the sun-wheel B being turned through the same number of revolutions in unit time. However, it is found most convenient in practice to arrange that the intermittent driving mechanism gives infrequent, but long, kicks, so that the number of ratchet teeth in the one-way clutch can be reduced to the minimum.

I claim:

1. An excess demand meter comprising in combination, a metering mechanism; constant speed driving means; an intermittent driving mechanism operable by said constant speed driving means, said intermittent driving mechanism comprising a crank mechanism driven from said constant speed driving means, a bell-crank member oscillatable by said crank mechanism, a ratchet wheel, a radial arm pivoted on an axis concentric with said ratchet wheel, a pawl mounted on said radial arm for actuating said ratchet wheel, and a tension spring connecting said radial arm to said bell-crank member; a differential gear comprising a pair of sun-wheels and a planet carrier, one of said sun-wheels being operable by said metering mechanism, and the other of said sun-wheels operable intermittently by said intermittent driving mechanism; a one-way clutch comprising an input member controlled by said planet carrier, and an output member, with lost-motion between said members; and a set of meter dials operable by the output member of said clutch to register the consumption in excess of a pre-arranged rate of use.

2. An excess demand meter comprising, in combination, a metering mechanism; constant speed driving means; an intermittent driving mechanism operable by said constant speed driving means, said intermittent driving mechanism comprising a crank mechanism driven from said constant speed driving means, a bell-crank member oscillatable by said crank mechanism, a ratchet wheel, a radial arm pivoted on an axis concentric with said ratchet wheel, a pawl mounted on said radial arm for actuating said ratchet wheel, a tension spring connecting said radial arm to said bell-crank member, and adjustable means for regulating the angle through which said ratchet wheel is turned for each revolution of said crank mechanism, and a differential gear comprising a pair of sun-wheels and a planet carrier, one of said sun-wheels being operable by said metering mechanism, and the other of said sun-wheels operable intermittently by said ratchet wheel; a one-way clutch comprising an input member controlled by said planet carrier, and an output member, with lost-motion between said members; and a set of meter dials operable by the output member of said clutch to register the consumption in excess of a pre-arranged rate of use.

3. An excess demand meter comprising, in combination, a metering mechanism; constant speed driving means; an intermittent driving mechanism operable by said constant speed driving means, said intermittent driving mechanism comprising a crank mechanism driven from said constant speed driving means, a bell-crank member oscillatable by said crank mechanism, a ratchet wheel, a radial arm pivoted on an axis concentric with said ratchet wheel, a pawl mounted on said radial arm for actuating said ratchet wheel, a tension spring connecting said radial arm to said bell-crank member, and an adjustable stop member disposed in the path of movement of said radial arm to determine the angle through which said ratchet wheel is turned for each revolution of said crank mechanism; a differential gear comprising a pair of sun-wheels and a planet carrier, one of said sun-wheels being operable by said metering mechanism and the other of said sun-wheels operable intermittently by said ratchet wheel; a one-way clutch comprising an input member controlled by said planet carrier, and an output member, with lost-motion between said members; and a set of meter dials operable by the output member of said clutch to register the consumption in excess of a prearranged rate of use.

4. An excess demand meter comprising, in combination, a metering mechanism; constant speed driving means; an intermittent driving mechanism operable by said constant speed driving means, said intermittent driving mechanism comprising a crank mechanism driven from said constant speed driving means, a bell-crank member oscillatable by said crank mechanism, a ratchet wheel, a radial arm pivoted on an axis concentric with said ratchet wheel, a pawl mounted on said radial arm for actuating said ratchet wheel, a tension spring connecting said radial arm to said bell-crank member, and an abutment on said bell-crank member disposed so that when said bell-crank member carries out its return movement after having driven said radial arm forward said abutment bears against said radial arm and restores it to its initial position; a differential gear comprising a pair of sun-wheels and a planet carrier, one of said sun-wheels being operable by said metering mechanism, and the other of said sun-wheels operable intermittently by said intermittent driving mechanism; a one-way clutch comprising an input member controlled by said planet carrier, and an output member, with lost-motion between said members; and a set of meter dials operable by the output member of said clutch to register the consumption in excess of a pre-arranged rate of use.

5. An excess demand electricity meter comprising, in combination, an electric induction meter; constant speed driving means; an intermittent driving mechanism operable by said constant speed driving mechanism, said intermittent driving mechanism comprising a crank mechanism driven from said constant speed driving means, a bell-crank member oscillatable by said crank mechanism, a ratchet wheel, a radial arm pivoted on an axis concentric with said ratchet wheel, a pawl mounted on said radial arm for actuating said ratchet wheel, a tension spring connecting said radial arm to said bell-crank member, means associated with said bell-crank member operative to restore said radial arm to its initial position when said bell-crank member carries out its return movement, and adjustable means for regulating the angle through which said ratchet wheel is turned for each revolution of said crank mechanism; rotatable means arranged to be driven in one direction by said electric induction meter and in the opposite direction by said intermittent driving mechanism; a one-way clutch comprising an input member controlled by said rotatable means, and an output member, with lost-motion between said members; and a set of meter dials operatively connected with the output member of said clutch only when the rate of consumption of electricity exceeds a prescribed normal maximum demand.

6. An excess demand meter comprising, in combination, a metering mechanism, a planetary gearing comprising sun members and a planet carrier member, a driving connection between said metering mechanism and one of said gearing members, a registering train connected to be driven through a one-way drive connection from a second member of said gearing, an oscillatable member, means for oscillating said member at a predetermined frequency, one-way drive means for intermittently rotating the third member of said gearing by oscillations of said oscillatable member, and adjustable means for varying the extent of rotation of said third gearing member for each oscillation of said oscillatable member.

7. An excess demand meter comprising, in combination, a metering mechanism, a planetary gearing comprising sun members and a planet carrier member, a driving connection between said metering mechanism and one of said gearing members, a registering train connected to be driven through a one-way drive connection from a second member of said gearing, an oscillatable member, means for oscillating said member at a predetermined frequency, one-way drive means for intermittently rotating the third member of said gearing by oscillations of said oscillatable member, adjustable means including a movable member for varying the amplitude of oscillation of said oscillatable member and thereby varying the extent of rotation of said third gearing member for each oscillation of said oscillatable member, and a graduated scale positioned adjacent said movable member for indicating the normal maximum demand corresponding to the setting of said movable member.

8. An excess demand meter comprising, in combination, a metering mechanism, a planetary gearing comprising sun members and a planet carrier member, a driving connection from said metering mechanism to one of said members, a registering train connected to be driven from a second member of said planetary gearing, a constant speed motor, and a variable speed transmission mechanism interposed between said constant speed motor and the third member of said gearing and arranged to connect said motor intermittently to said last-mentioned member, said transmission mechanism comprising a pivoted element connected to be oscillated by said constant speed motor, a second pivoted element in driving relation with said third member of said planetary gearing, a resilient connection between said pivoted elements, and an adjustable stop located in the path of said second pivoted element to regulate the amplitude of movement of same.

JOHN SOMERVILLE HIGHFIELD.